(12) United States Patent
Tsagkatakis et al.

(10) Patent No.: US 8,873,798 B2
(45) Date of Patent: Oct. 28, 2014

(54) METHODS FOR TRACKING OBJECTS USING RANDOM PROJECTIONS, DISTANCE LEARNING AND A HYBRID TEMPLATE LIBRARY AND APPARATUSES THEREOF

(75) Inventors: Grigorios Tsagkatakis, Rochester, NY (US); Andreas Savakis, Fairport, NY (US)

(73) Assignee: Rochester Institue of Technology, Rochester, NY (US)

( * ) Notice: Subject to any disclaimer, the term of this patent is extended or adjusted under 35 U.S.C. 154(b) by 709 days.

(21) Appl. No.: 13/022,413

(22) Filed: Feb. 7, 2011

(65) Prior Publication Data
US 2011/0243381 A1    Oct. 6, 2011

Related U.S. Application Data

(60) Provisional application No. 61/301,756, filed on Feb. 5, 2010.

(51) Int. Cl.
*G06K 9/00* (2006.01)
*G06K 9/62* (2006.01)
*G06K 9/66* (2006.01)
*G06T 7/20* (2006.01)

(52) U.S. Cl.
CPC . *G06K 9/66* (2013.01); *G06T 7/204* (2013.01); *G06T 2207/30201* (2013.01); *G06K 6/6255* (2013.01); *G06K 9/6215* (2013.01)
USPC .......... 382/103; 382/209; 382/217; 382/218; 348/169

(58) Field of Classification Search
CPC . G06K 9/6202; G06K 9/6206; G06K 9/6215; G06T 7/20; G06T 7/2013; G06T 7/202; G06T 7/2026; G06T 7/204; G06T 7/2046
USPC ................... 382/103, 209, 217, 218; 348/169
See application file for complete search history.

(56) References Cited

U.S. PATENT DOCUMENTS 5,062,056 A * 10/1991 Lo et al. .................. 235/411
5,757,287 A * 5/1998 Kitamura et al. ........... 340/937

(Continued)

OTHER PUBLICATIONS

Han, et al. "Random Projection with Robust Linear Discriminant Analysis Model in Face Recognition." Computer Graphics, Imaging and Visualisation. (2007): 11-15. Print.*

(Continued)

*Primary Examiner* — Michael A Newman
(74) *Attorney, Agent, or Firm* — Joseph M. Noto; Bond Schoeneck & King PLLC

(57) ABSTRACT

A method, non-transitory computer readable medium, and apparatus that tracks an object includes utilizing random projections to represent an object in a region of an initial frame in a transformed space with at least one less dimension. One of a plurality of regions in a subsequent frame with a closest similarity between the represented object and one or more of plurality of templates is identified as a location for the object in the subsequent frame. A learned distance is applied for template matching, and techniques that incrementally update the distance metric online are utilized in order to model the appearance of the object and increase the discrimination between the object and the background. A hybrid template library, with stable templates and hybrid templates that contains appearances of the object during the initial stage of tracking as well as more recent ones is utilized to achieve robustness with respect to pose variation and illumination changes.

18 Claims, 7 Drawing Sheets

(56) References Cited

U.S. PATENT DOCUMENTS

| | | | | |
|---|---|---|---|---|
| 6,148,092 | A * | 11/2000 | Qian | 382/118 |
| 6,219,640 | B1 * | 4/2001 | Basu et al. | 704/246 |
| 6,687,386 | B1 * | 2/2004 | Ito et al. | 382/103 |
| 7,058,205 | B2 * | 6/2006 | Jepson et al. | 382/103 |
| 7,231,064 | B2 | 6/2007 | Rui et al. | |
| 7,590,262 | B2 | 9/2009 | Fujimura et al. | |
| 7,620,218 | B2 | 11/2009 | Steinberg et al. | |
| 7,671,787 | B2 | 3/2010 | Kinoshita et al. | |
| 7,697,720 | B2 * | 4/2010 | Low | 382/103 |
| 7,747,151 | B2 | 6/2010 | Kochi et al. | |
| 7,764,808 | B2 | 7/2010 | Zhu et al. | |
| 7,796,780 | B2 | 9/2010 | Lipton et al. | |
| 7,836,115 | B1 * | 11/2010 | Achlioptas | 708/401 |
| 2006/0018516 | A1 * | 1/2006 | Masoud et al. | 382/115 |
| 2006/0023916 | A1 * | 2/2006 | Yang et al. | 382/103 |
| 2007/0098218 | A1 | 5/2007 | Zhang et al. | |
| 2007/0183629 | A1 | 8/2007 | Porikli et al. | |
| 2008/0063236 | A1 | 3/2008 | Ikenoue et al. | |
| 2009/0061971 | A1 | 3/2009 | Weitzner et al. | |
| 2009/0141936 | A1 * | 6/2009 | Abe | 382/103 |
| 2009/0262977 | A1 | 10/2009 | Huang et al. | |

OTHER PUBLICATIONS

Zhou, et al. "Object Tracking Based on Dynamic Template and Motion Prediction." Journal of Computational Information Systems. 5.6 (2009): 1841-1846. Print.*

Babenko, et al. "Visual Tracking with Online Multiple Instance Learning." CPVR 2009. (2009): 1-8. Print.*

Matthews et al., "The template update problem," IEEE Pattern Analysis and Machine Intelligence, vol. 26(6), pp. 810-815, 2004.

Jepson et al., "Robust online appearance models for visual tracking," IEEE Pattern Analysis and Machine Intelligence, vol. 25(10), pp. 1296-1311, 2003.

Lim et al., "Incremental learning for robust visual tracking," Int. Journal of Computer Vision, vol. 77(1), pp. 125-141, 2008.

Black et al., "Eigentracking: Robust matching and tracking of articulated objects using a view based representation," Int. Journal of Computer Vision, vol. 26(1), pp. 63-84, 1998.

Yilmar et al., "Object tracking: A survey," ACM computing surveys, vol. 38, No. 4, pp. 1-45, 2006.

Kitagawa, "Non-Gaussian state-space modeling of nonstationary time series," Journal of American Statistical Association, vol. 82, pp. 1032-1063, 1987.

Isard et al., "Condensation—Conditional density propagation for visual tracking," Int. Journal of Computer Vision, vol. 29(1), pp. 5-28, 1998.

Huttenlocher et al., "Tracking non-rigid objects in complex scenes," Int. Conf. on Computer Vision, pp. 93-101, 1993.

Isard et al., "Contour tracking by stochastic propagation of conditional density," Lecture Notes in Computer Science, vol. 1064, pp. 343-356, 1996.

Kaneko et al., "Template update criterion for template matching of image sequences," Int. Conf. on Pattern Recognition, vol. 2, 2002.

Dowson et al., "Simultaneous modeling and tracking (SMAT) of feature sets," IEEE Conf. on Computer Vision and Pattern Recognition, vol. 2, 2005.

Woodley et al., "Tracking using online feature selection and a local generative model," British Machine Vision Conference, 2007.

Collins et al., "Online selection of discriminative tracking features," IEEE Pattern Analysis, (2005).

Latecki et al., "Object tracking with dynamic template update and occlusion detection," Int. Conf. Pattern Recognition, vol. 1, pp. 556-560, 2006.

Commaniciu et al., "Kernel-based object tracking," IEEE Pattern Analysis Machine Intelligence, vol. 25(5), pp. 564-577, 2003.

Lucas et al., "An iterative image registration technique with an application to stereo vision", Proc. DARPA IU Workshop, pp. 121-130, 1981.

Bowyer et al., "Edge detector evaluation using empirical ROC curves," IEEE Int. Conf. on Computer Vision and Pattern Recognition, vol. 1, pp -359, 1999.

Lowe, "Object recognition from local scale-invariant features", IEEE Int. Conf. on Computer Vision, vol. 2, pp. 1150-1157, 1999.

Zhou et al., "Object tracking using SIFT features and mean shift," Computer Vision and Image Understanding, vol. 113(3), pp. 345-352, 2009.

Kim et al., "Face tracking and recognition with visual constraints in real world videos," IEEE Conf. on Computer Vision and Pattern Recognition, pp. 1-8, 2008.

Grabner et al., "Realtime tracking via online boosting," British Machine Vision Conference, vol. 1, pp. 47-56, 2006.

Rinner et al., "The evolution from single to pervasive smart cameras," ACM/IEEE International Conference on Distributed Smart Cameras, pp. 1-10, 2008.

Akyidiz et al., "A survey on wireless multimedia sensor networks," Computer Networks, vol. 51, No. 4, pp. 921-960, 2007.

Bingham et al., "Random projection in dimensionality reduction: applications to image and text data," ACM SIGKDD International Conference on Knowledge Discovery and Data Mining, pp. 245-250, 2001.

Isard et al., "Condensation—Conditional Density Propagation for Visual Tracking," International Journal of Computer Vision, vol. 29, No. 1, pp. 5-28, 1998.

Commaniciu et al., "Kernel-based object tracking," IEEE Trans. Pattern Analysis Machine Intelligence, vol. 25, No. 5, pp. 564-577, 2003.

Achlioptas, "Database-friendly random projections: Johnson-Lindenstrauss with binary coins," Journal of Computer and System Sciences, vol. 66, No. 4, pp. 671-687, 2003.

Li et al., "Very sparse random projections," ACM International Conference on Knowledge Discovery and Data Mining, pp. 287-296, 2006.

Wright et al., "Robust face recognition via sparse representation," IEEE Trans. on Pattern Analysis and Machine Intelligence, vol. 31, No. 2, pp. 210-227, 2009.

Reddy et al., "Compressed sensing for multi-view tracking and 3¬D voxel reconstruction," IEEE International Conference on Image Processing, pp. 221-224, 2008.

Takhar et al., "A new compressive imaging camera architecture using optical-domain compression," Proc. IS&T/SPIE Symposium on Electronic Imaging: Computational Imaging, vol. 6065, pp. 43-52, 2006.

Yilnaz et al., "Object tracking: A survey," ACM computing surveys, vol. 38, No. 4, pp. 1-45, 2006.

Lucas et al., "An iterative image registration technique with an application to stero vision", Proc. DARPA IU Workshop, pp. 121-130, 1981.

Horn et al., Determining optical flow, Artificial Intelligence, vol. 17, pp. 185-203, 1981.

Lowe, "Object recognition from local scale-invariant features", IEEE International Conference on Computer Vision, vol. 2, pp. 1150-1157, 1999.

Kaski, "Dimensionality reduction by random mapping: Fast Similarity Computation for Clustering," IEEE International Joint Conference on Neural Networks and Computatiotional Intelligence, vol. 1, pp. 413-418, 1998.

Huang et al., "Survey on Block Matching Motion Estimation Algorithms and Architectures with New Results," The Journal of VLSI Signal Processing, vol. 42, No. 3, pp. 297-320, 2006.

Black et al., "Eigentracking: Robust matching and tracking of articulated objects using a view-based representation," International Journal of Computer Vision, vol. 26, No. 1, pp. 63-84, 1998.

Jepson et al., "Robust Online Appearance Models for Visual Tracking", IEEE Trans. on Pattern Recognition and Machine Intelligence, vol. 25, No. 10, pp. 1296-1311, 2003.

(56) References Cited

OTHER PUBLICATIONS

Latecki et al., "Object Tracking with Dynamic Template Update and Occlusion Detection," International Conference Pattern Recognition, vol. 1, pp. 556-560, 2006.

Lim et al., "Incremental Learning for Robust Visual Tracking," International Journal of Computer Vision, vol. 77, No. 1-3, pp. 125-141, 2008.

Kim et al., "Face Tracking and Recognition with Visual Constraints in Real World Videos", IEEE. Conference on Computer Vision and Pattern Recognition, pp. 1-8, 2008.

Matthews et al., "The Template Update Problem", IEEE Trans. on Pattern Analysis and Machine Intelligence, vol. 26, No. 6, pp. 810-815, 2004.

Javed et al., "Appearance modeling for tracking in multiple non-overlapping cameras," IEEE International Conference on Computer Vision and Pattern Recognition, vol. 2, pp. 26-33, 2005.

* cited by examiner

FRAME 5

FRAME 41

FRAME 84

FRAME 97

FRAME 102

FRAME 106

FRAME 110

FRAME 114

FRAME 118

FRAME 124

FRAME 190

FRAME 199

FRAME 3

FRAME 69

FRAME 84

FRAME 114

FRAME 173

FRAME 206

FRAME 223

FRAME 240

FRAME 338

FRAME 363

FRAME 389

FRAME 492

FRAME 454

FRAME 454

FRAME 454

FRAME 454

FRAME 454

FRAME 454

CAM 1, FRAME 4

CAM 1, FRAME 8

CAM 1, FRAME 13

CAM 1, FRAME 17

CAM 1, FRAME 20

CAM 1, FRAME 23

CAM 2, FRAME 1

CAM 2, FRAME 4

CAM 2, FRAME 6

CAM 2, FRAME 10

CAM 2, FRAME 12

CAM 2, FRAME 14

METHODS FOR TRACKING OBJECTS USING RANDOM PROJECTIONS, DISTANCE LEARNING AND A HYBRID TEMPLATE LIBRARY AND APPARATUSES THEREOF

This application claims the benefit of U.S. Provisional Patent Application Ser. No. 61/301,756, filed Feb. 5, 2010, which is hereby incorporated by reference in its entirety.

FIELD

This technology generally relates to methods and apparatuses for tracking objects and, more particularly, to methods for tracking objects using random projections, distance learning and a hybrid template library and apparatuses thereof.

BACKGROUND

Object tracking, and face tracking in particular, have been widely investigated problems, in part due to their potential for use in many real world applications. At the same time, tracking faces in unconstrained environments is a challenging task due to real-time performance requirements and robustness with regards to changes in the object's appearance. A variety of different tracking approaches have been tried that can coarsely be divided in three categories: point tracking; silhouette tracking; and template based tracking.

In point tracking, the object is represented as a collection of points. Mechanisms, such as position and motion estimation, are used for the prediction of the point's location in the next frame. Examples of point tracking algorithms are the Kalman filter approach and the particle filter approach.

In silhouette tracking algorithms, the goal is to model the object and use the model in order to locate the target in the current frame. This can be achieved using either a shape matching algorithm or a contour tracking approach.

In template-based tracking, the methods use a template representing the object and try to estimate the position of the object in the current frame. More specifically, in template based tracking a region containing the object is selected in the first frame either manually or automatically and appropriate features are extracted. In subsequent frames, every image is searched in order to identify the location that maximizes a similarity score between the template comprising the extracted features and the particular image region. The key issues related to template based tracking are the types of features that are extracted and the similarity score that is employed.

One of the most popular features used in object tracking is color. The object is represented using its appearance in some colorspace such as the RGB, the HSV and the L*a*b*. One prior approach proposed a tracking algorithm that considered color histograms, as features, that were tracked using the mean-shift algorithm. Despite its success, this algorithm unfortunately exhibits high sensitivity to illumination changes that may cause the tracker to fail.

Another type of feature that has been used for tracking is edges. Edges are less sensitive to illumination changes compared to color. Nevertheless, no generic edge detection method performs well in every scenario, and in most cases the extracted edges are application specific.

Optical flow is another popular feature used in tracking. Optical flow is a set of vectors indicating the translation of each pixel in a region. When computing optical flow, there is an assumption that corresponding pixels in consecutive frames have the same brightness, called the "brightness constancy" assumption. Tracking algorithms using optical flow are usually based on the Lucas-Kanade method.

One of the more recent feature extraction methods is based on the extraction of interest points. Scale Invariant Feature Transform (SIFT), proposed uses differences of Gaussian functions in scale space in order to identify the interest point and their location, orientation and scale in order to describe them. SIFT features combined with the color histogram mean shift were combined for object tracking.

Recently, there has been an increased interest in applying online learning for feature selection in the context of tracking. With this tracking, the region around the object in the previous frame was used as a positive example and the background regions surround it as negative examples for training a boosting classifier. The algorithm does not require a priori knowledge of the object's model and is able to adapt to variations in its appearance. Nevertheless, it introduces additional computational complexity due to training and is susceptible to drift and occlusion since no explicit model of the object is maintained.

In addition to the type of features that are extracted, the metric used for comparing candidate regions is very important. Some of the widely used distance metrics for template based tracking include cross-correlation, the Bhattacharya coefficient, the Kullback-Leibler divergence and sum-of-square differences.

Off-line trained models have also been suggested for tracking which use a view-based eigenbasis representation and a robust error norm. In one off-line trained model a probabilistic approach for tracking contours was used. A major bottleneck of these methods is that once the model is created, it is not updated and as a result tracking may fail due to changes in illumination not accounted for during training. In addition, they require training with all possible poses which is time consuming.

The assumption that the appearance of the object remains the same throughout the tracking is unrealistic in real-world videos. Recently, various algorithms have been presented that update the object's template in order to match the current appearance.

Other prior approaches have suggested modeling the object using three components: the wandering; the stable; and the lost. Although their approach is capable of handling variations in the object's appearance, no drift correction is applied and the tracking may fail due to slow adaptation to non-object. In addition the computational cost of maintaining and updating the model can prevent real-time performance.

In another prior approach, a template update technique was proposed in conjunction with the Lukas-Kanade tracker. Spatiotemporal motion regions were used for constraining the search region and the alignment space while a cost function was employed in the case of occlusion.

In yet another approach, an online learning method for template update was presented where the object is represented in a low-dimensional space using principal components analysis (PCA). Although this proposed method succeeds in utilizing an updated object model, it is vulnerable to drift because no global constraints are used to confine the subspace representation of the model.

A known problem of many prior adaptive template based tracking algorithms is drift. Drift occurs when small misalignments cause the tracker to gradually adapt to non-target background and fail.

A template update method was proposed to correct for the drift. With this method, a template was generated as a linear combination of the initial template (obtained in the first frame) and the aligned object's appearance in the current frame. As a result, both the initial model and the current appearance were used for the template. Even though the algorithm was robust against drift, it tolerates little deviation in the object's appearance. Considering the case of face tracking, a linear combination of a frontal face and a 45 degrees profile face will not reliably represent the face in every frame.

The Eigentracking approach has been extended by incrementally updating the eigenbasis of the object's appearance. Robustness against drift was later introduced by applying visual constraints of the object's appearance in the context of particle filter tracking. Two types of constraints where introduced, generative for pose and discriminative for alignment. For the pose constraints, the authors constructed a set of pose subspaces and utilized the distance among the subspace as a constraint in the possible pose. For alignment, a support vector classifier was employed. Although this approach tackles the problem of drift, it relies on training and thus limits its applicability to already learned cases.

Another proposal was an online selection of features for increased robustness in tracking. Feature selection was based on the discrimination of the object and the background and they were adaptively updated through tracking. The problem of drift was tackled by pooling pixel samples from previous tracked frames while keeping the model consistent with the initial appearance. The algorithm can adapt to small variation in object's appearance, but it fails when the initial appearance is no longer consistent with the current one such as large pose variations.

A template update mechanism also has been suggested. A comparison was made between the error that would occur if the template was updated and the error if the template was not updated. The comparison was based on a criterion that considered the estimated covariance matrix of the template matching error. Similarly to other methods, this method assumes that the appearance of the objection will not change significantly during tracking.

Another proposal was an SMAT object tracking algorithm that combined modeling of the object's appearance with tracking. SMAT uses a set of templates (exemplars) sampled from previous frames and the mutual information metric in order to select the closest matching feature templates. In addition, it continually updates a shape model of the features. A major benefit of SMAT is that it becomes more robust as tracking progresses. Although the SMAT algorithm correctly updates the templates, no discussion is made with regards to the robustness of the method in the case of occlusion when the features that are tracked are no longer visible.

In another approach, the use of local generative model to constrain the feature selection process in online feature selection tracking algorithms was introduced. Non-negative matrix factorization was employed in order to identify basis functions that describe the object appearance. The method was able to identify occlusions and select only appropriate features. However, it is based on an off-line training stage that may limit its flexibility.

SUMMARY

A method for tracking an object includes utilizing with an object tracking processing device random projections to represent an object in a region of an initial frame in a transformed space with at least one less dimension. One of a plurality of regions in a subsequent frame with a closest similarity between the represented object and one or more of plurality of templates is identified with the object tracking processing device as a location for the object in the subsequent frame.

A non-transitory computer readable medium having stored thereon instructions for tracking an object comprising machine executable code which, when executed by at least one processor, causes the processor to perform steps including utilizing random projections to represent an object in a region of an initial frame in a transformed space with at least one less dimension. One of a plurality of regions in a subsequent frame with a closest similarity between the represented object and one or more of plurality of templates is identified as a location for the object in the subsequent frame.

An object tracking apparatus includes a memory coupled to one or more processors configured to execute programmed instructions stored in the memory including utilizing random projections to represent an object in a region of an initial frame in a transformed space with at least one less dimension. One of a plurality of regions in a subsequent frame with a closest similarity between the represented object and one or more of plurality of templates is identified as a location for the object in the subsequent frame.

The technology provides a number of advantages including providing more effective and efficient methods and apparatuses for tracking objects. This technology reduces the data representation and computational load that would be required by a typical template tracking method by utilizing random projections to represent the object in a lower dimensional space, which reduces both the computational complexity and the storage requirements. With this technology, object localization is achieved in the low dimension space via a template matching procedure.

Additionally, this technology utilizes a template library that captures the object's appearance at different stages of tracking and provides robustness to these types of changes. In addition, this technology provides a template library update mechanism that ensures that the templates in the library will not suffer from drift. For example, the template library could contain only the random projections of the objects tracked, instead of the full scale images so that it can reside in the main memory. In addition, when a learned distance is applied during the template matching process, techniques that incrementally update the distance metric are utilized in order to model the appearance of the object and increase the discrimination between the object and the background.

This technology also utilizes a hybrid template library with stable templates and hybrid templates that contains appearances of the object during the initial stage of tracking as well as more recent ones to achieve robustness with respect to pose variation and illumination changes. In order to keep the memory requirements low, the hybrid template library uses random projection representations of the object instead of the raw image data for the templates. This technology also can effectively and efficiently handle tracking where occlusion of the tracked object occurs and where there is a handoff between cameras.

DETAILED DESCRIPTION

Figure 1:
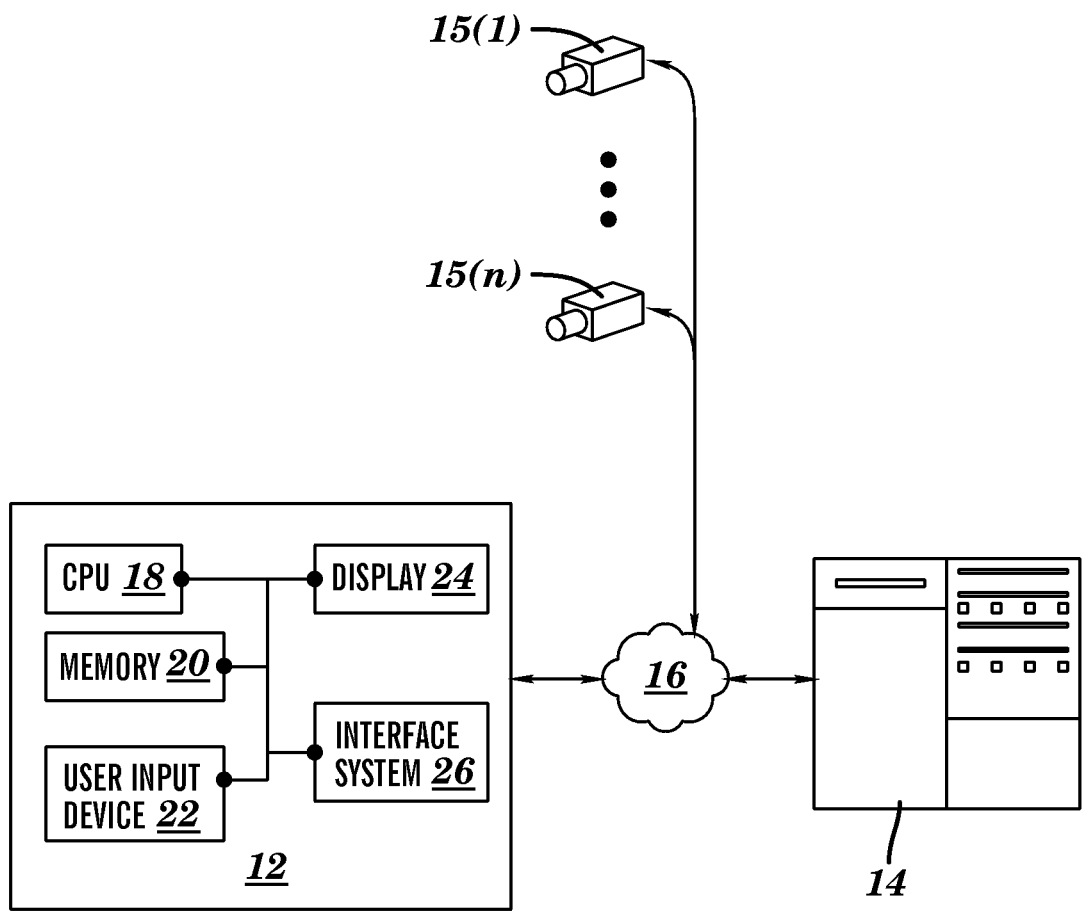
FIG. 1 is a block diagram of an environment with an exemplary object tracking processing apparatus.
Figure 2:
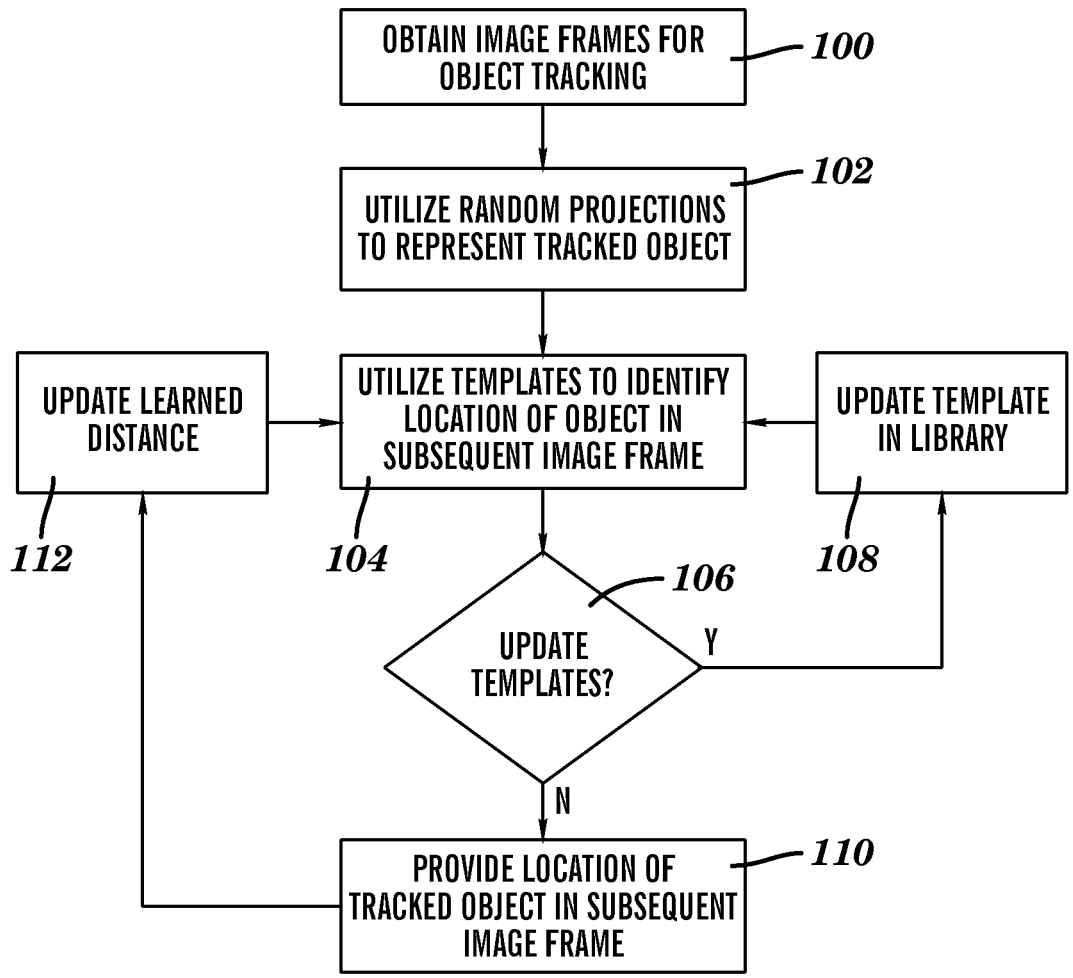
FIG. 2 is a flow chart of an exemplary method for tracking objects using random projections, distance learning and a hybrid template.

An environment 10 with an object tracking processing apparatus 12 is illustrated in FIG. 1. The environment 10 includes the object tracking processing apparatus 12, a template server 14, and a plurality of imaging devices 15(1)-15(n) coupled together by a communications network 16, although the environment can comprise other types and numbers of systems, devices, networks, and elements in other configurations. The technology provides a number of advantages including providing more effective and efficient methods and apparatuses for tracking objects.

The object tracking processing apparatus 12 includes a processor 18, memory storage device 20, a user input device 22, a display 24, and an interface system 26 which are coupled together by bus or other link, although the device may comprise other types and numbers of elements in other configurations.

The processor 18 in the object tracking processing apparatus 12 executes a program of stored instructions for one or more aspects of the present invention as described and illustrated herein, although the processor could execute other numbers and types of programmed instructions. The memory storage device 20 in the object tracking processing apparatus 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 18 in the object tracking processing apparatus 12 can be used for the memory storage device 20 in the object tracking processing apparatus 12.

The user input device 22 in the object tracking processing apparatus 12 is used to input selections and data, although the user input device could be used to input other types of information and interact with other elements. The user input device 22 can include a computer keyboard and a computer mouse, although other types and numbers of user input devices can be used.

The display 24 in the object tracking processing apparatus 12 is used to show images and other information to the user. The display 24 can include a computer display screen, such as a CRT or LCD screen, although other types and numbers of displays could be used.

The interface system 26 is used to operatively couple and communicate between the object tracking processing apparatus 12 and the template server 14 over the communication network 16, although other types and numbers of communication networks or systems with other types and numbers of connections and configurations to other types and numbers of systems, devices, and components can be used. By way of example only, the communication network can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

The template server 14 includes a central processing unit (CPU) or processor, a memory, and an interface or I/O system, which are coupled together by a bus or other link, although other numbers and types of network devices could be used. For example, the target signatures could be stored in other types of storage or computing devices and the images could be obtained directly from image capture sensors or other storage devices. Generally, in this example the template server 14 process requests received from the object tracking processing apparatus 12 via communication network 16 for stable and transient templates, although other types of requests and communications for other types of templates and other data could be processed.

The imaging devices 15(1)-15(n) comprise cameras which can be used to capture one or more image frames of an object that is being tracked, although other types and numbers of imaging devices can be used. Additionally, the frames of images being process can be obtained from other sources other than the imaging devices 15(1)-15(n).

Although the object tracking processing apparatus 12, template server 14, and plurality of imaging devices 15(1)-15(n) are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any example. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for tracking objects using random projections, online distance learning and a hybrid template will now be described with reference to FIGS. 1-7. In step 100, the object tracking processing apparatus 12 obtains one or more image frames from one or more of the imaging devices 15(1)-15(n) which are analyzed to track an object, although the image frames can be obtained from other sources and in other manners. If multiple imaging devices 15(1)-15(n) are used in network to track the object, the object tracking processing apparatus 12 the template library described in greater detail below is associated at the handoff with the next one of the imaging devices 15(1)-15(n) providing the image frames. This helps to provide a seamless tracking of the object even if multiple imaging devices 15(1)-15(n) are involved. In this example the object tracking processing apparatus 12 is online with the imaging devices 15(1)-15(n) to obtain the captured image frames while the object is currently being tracked, although the image frames can be obtained in other manners, such as an offline review of obtained image frames.

In step 102, the object tracking processing apparatus 12 utilizes random projections to represent the object in a region of an initial one of the obtained image frames in a transformed space with at least one less dimension. An overview of random projections followed by examples of how they are utilized by the object tracking processing apparatus 12 are set forth in greater detail below.

With respect to an overview regarding random projections, let $A \in \mathbb{R}^{m \times n}$ be a collection of m observations $\{u_i\} \in \mathbb{R}^n, i=\{1, \ldots, N\}$: Random Projection amounts to multiplying A with a random matrix $R \in \mathbb{R}^{k \times m}$ in order to obtain $B=1/\sqrt{n} RA \in \mathbb{R}^{k \times n}$. Dimensionality reduction is achieved when k<m. Given $1 > \epsilon > 0$, and integers n and k, then for every set P of n points in $R^d$ there exists a Lipchitz function $f: R^d \rightarrow R^k$ such that for all x, y in P:

$$(1-\epsilon)\|x-y\|^2 \leq \|f(x)-f(y)\|^2 \leq (1+\epsilon)\|x-y\|^2 \quad (1)$$

If $k \geq O(\epsilon^{-2} \log n)$, then the Johnson-Lindenstrauss (JL) lemma states that all the pairwise distances will be preserved up to an error factor.

An efficient method for dimensionality reduction using the JL lemma employs a random matrix R whose elements are drawn i.i.d. from a zero mean, bounded variance distribution. There are various choices for the random matrix. A random matrix with elements generated by a normal distribution $r_{i,j} \sim N(0,1)$ is one of the simplest in terms of analysis. One advantage with this type of random projection is its modest computational complexity due to the dense nature of the projection matrix. The use of sparse projection matrices has been suggested with elements drawn i.i.d. as:

$$r_{i,j} = \sqrt{3} \begin{cases} 1 & \text{with probability } 1/6 \\ 0 & \text{with probability } 2/3 \\ -1 & \text{with probability } 1/6 \end{cases}$$

Sparse random projections, offers a threefold reduction by discarding two thirds of the data. A method for achieving a $\sqrt{n-}$ fold increase in speedup with a small penalty in the preservation of the pairwise distances. In the example described herein, sparse random projections are used by the object tracking processing apparatus 12.

Random projections utilized by the object tracking processing apparatus 12 may be viewed as a representation method that combines very interesting characteristics making it ideal for computer vision. First, it tackles the "curse of dimensionality" by projecting the data to a much lower dimensional space. In addition, problems that deal with large amounts of data, such as tracking objects, can be tackled more efficiently by operating on less data in the object tracking processing apparatus 12. Furthermore, random projections is data independent, in contrast to similar dimensionality reduction techniques, such as principal components analysis (PCA), preserving the structure of the input data.

Another benefit of using random projections in the object tracking processing apparatus 12 is that using random projections as soon as the image is captured, or even directly capturing random projections with one or more of the imaging devices 15(1)-15(n), provides some level of privacy since both the object and the model are described using random projections. Even though the original images can still be recovered from the random projections, the recovery is much more difficult if the random projection matrix is not known.

When utilizing random projections for tracking in the object tracking processing apparatus 12 the choice of features in not as important as the number of features. This is significant for constrained environments, such as mobile and embedded vision systems, where elaborate feature extraction may not be feasible due to the imposed limitations. The random projections transformation can be applied to reduce the dimensions of any type of vectorizable features when used for tracking in the object tracking processing apparatus 12.

In step 104, the object tracking processing apparatus 12 identifies one of a plurality of regions in a subsequent frame with a closest similarity between the represented object and one or more of plurality of templates obtained from a template server 15 as a location for the object in the subsequent image frame, although other manners for identifying the location and other manners for obtaining the templates can be used. An overview of template matching followed by examples of how they are utilized by the object tracking processing apparatus 12 are set forth in greater detail below.

Exhaustively searching the full image for a block that exhibits high similarity with the object being tracked is extremely computationally demanding, and is not suitable for a resource constrained system. Exemplary embodiments of this technology operate under a smooth motion assumption, i.e. the object's location in the next image frame will be adjacent to the location in the previous frame so that, for most cases, only a small region has to be searched. Another assumption with the exemplary embodiments of this technology described herein is that the similarity increases monotonically as the candidate region approaches the true location. With these assumptions taken into consideration, the exemplary embodiments of this technology described herein can provide significant reduction of computational cost.

In this example, a simple block matching technique that combines accuracy with low computational complexity is used by the object tracking processing apparatus 12. Let I(X;t+1) be the candidate image regions in the current time instance t+1 respectively and X be the coordinates vector. The image regions are assumed to have been transformed in a vector representation. $\hat{I}(X;t+1)$ is defined to be the random projections of I(X;t+1) and $M=\{M_i\} i=1 \ldots m$ to be the object's template library that is discussed in the next section. The goal of the block matching with the object tracking processing apparatus 12 is to minimize the following error function:

$$e(X) = \arg \min_{i=1 \ldots m} D(\hat{I}(X; t+1), M_i) \quad (2)$$

In this equation, D is a distance metric that indicates the similarity between different image patches. Different choices for the distance metric are discussed below. The minimization problem can be solved analytically by using an iterative optimization method, such as gradient descent, by the object tracking processing apparatus 12. In order to solve the equivalent discretized problem, a selection of how to model the gradient is made with the object tracking processing apparatus 12. If the gradient is coarsely approximated, i.e. using a large step size value, the method will converge faster but the solution may lack accuracy. If a small value is selected, more iterations will be necessary but the solution will exhibit higher accuracy.

Figure 3:
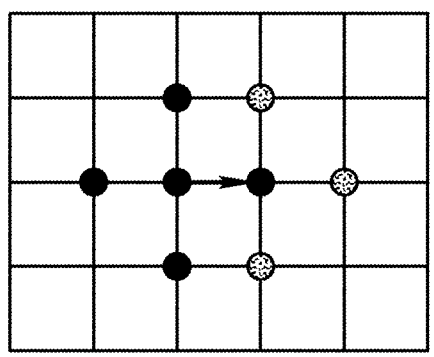
FIG. 3 is an exemplary diagram of a search patter for block matching.

A practical approximation of the minimization is performed by the object tracking processing apparatus 12 as follows. First, the object tracking processing apparatus 12 centers the search window at the location of the object in the previous frame. Assuming that all the candidate regions are normalized and randomly projected, the object tracking processing apparatus 12 calculates the inner products of the 4- or 8-neighbor candidate image regions, as shown in FIG. 3, with the template library. The neighbor region with the higher score is set as the center of the search window in the next iteration by the object tracking processing apparatus 12. If higher accuracy is required the candidate image regions can overlap. The process executed by the object tracking processing apparatus 12 stops when the central region achieves the highest score.

Techniques for fast block matching with the object tracking processing apparatus 12 in these examples include three-step search, cross-search and diamond search. The goal of these methods is to locate the block with the minimum distance to the original block without being trapped in local minima. The distance is usually measured in terms of distortion where metrics include mean-square error (MSE), sum-of-absolute differences (SAD) and mean absolute differences (MAD).

As an example, the exemplary technology described herein can use three different distance metrics for measuring the similarity between the images in the template library and the candidate image regions. These methods are the inner product, the kernel trick and a learned distance. Each method poses its own advantages and disadvantages that are mostly related to the relationship between accuracy, robustness and computational complexity. The methods are mathematically expressed as similarities between image regions but they can be extended to similarities between regions and templates from the template library as discussed next.

The first proposed metric is the inner product between random projections. The inner product is as a generic and lightweight distance metric for template matching. Let I(X; t+1) and Î(X;t+1) be the image regions and their corresponding random projections as before. Using the inner product, the object windows in the next frame is found my maximizing:

$$\hat{X} = X + \Delta X = \min_{X+\Delta X \in S} \min_{i=1\ldots p} d_G(\hat{I}(t, X + \Delta X), M_i) \quad (3)$$

where S is the search region which can be specified by the user. The extent of the search region involves a tradeoff, especially for resource constrained systems. A small region will cause the method to fail when the object exhibits fast motion, whereas a large search region will introduce latency to the system. Normalization of the input vectors to zero mean and unit variance can be performed for the purpose of achieving invariance to changes in illumination. When the input vectors are normalized, the inner product corresponds to evaluating the cosine of the angle formed by the vectors. In that sense, this example of the method utilizes an angle based metric that selects the image region corresponding to the smallest angles with the templates.

The inner product could be extended by the kernel trick. Examples of the Kernel trick include the polynomial $$K(x, y) = (1 + x^T y)^d \text{ and the Gaussian } K(x, y) = e^{\frac{1}{2\sigma^2}\|x-y\|^2}$$

and the in this case the new location is found by solving:

$$\tilde{X} = X + \Delta X = \arg\max_{X+\Delta X \in S} K(\hat{I}(X + \Delta X; t+1), \hat{I}(X; t)) \quad (4)$$

The advantage of the Kernel trick is that the similarity between images is estimated in a higher dimensional space and can thus be more robust to changes in the object's appearance. The benefit of robustness comes with a moderate additional cost in terms of computational complexity.

Although the inner product and the Kernel trick are lightweight metrics and they can be used for object tracking in resource constrained environments, they are generic and, as a result, may fail to capture characteristics that could provide more discriminating power in cases where the background and the object exhibit similar characteristics. On the other hand, distance metric learning (DML) for similarity estimation has been extensively studied in the field of image retrieval and object recognition. The goal in supervised DML is to discover a distance metric that satisfies the constraints imposed by class labels i.e. keep the data points from the same class close and the data points from different classes far apart.

In supervised DML, the objective by the object tracking processing apparatus 12 is to learn a new distance that will satisfy the pairwise constraints that are imposed by the class label information. The new distance metric can be expressed as either a Mahalanobis-like distance or equivalently as a linear transformation of the input data. Formally, the distance between two data points x and y∈ $\mathbb{R}^n$ is given by $$d_G(x,y) = \|x-y\|_G^2 = (x-y)^T G(x-y) \quad (5)$$

where G∈ $\mathbb{R}^{n \times n}$ is the distance matrix. Alternatively, the matrix G can be decomposed as G=$L^T L$ in which case the previous equation becomes $$d_G(x,y) = (L(x-y))^T (L(x-y)) \quad (6)$$

and the new distance is given by the Euclidean distance of the linearly transformed data. A well known approach in distance learning utilized the inverse of the covariance matrix as the matrix G. However, modern approaches only require that the matrix G is positive semidefinite since this property guarantees that the new distance will satisfy the requirements for a proper metric i.e. triangular inequality, non-negativity and symmetry.

The objective of distance metric learning is to learn a new distance function such as $$d_G(x,y) \leq u \text{ when label}(x) \times \text{label}(y) \quad (7)$$

and $$d_G(x,y) > l \text{ when label}(x) \neq \text{label}(y) \quad (8)$$

When the learned distance is used, the objective of template matching is to locate the region that minimizes the following equation $$\tilde{X} = X + \Delta X = \arg\max_{X+\Delta X \in S} d_G(\hat{I}(X+\Delta X; t+1), \hat{I}(X, t)) \quad (9)$$

In step 106, before proceeding to step 110 the object tracking processing apparatus 12 determines whether to update the template library. If in step 106, the object tracking processing apparatus 12 decides to update the template library, then the Yes branch is taken to step 108 to update the template library. In this example, even if the Yes branch is taken from step 106 to step 108, the object tracking processing apparatus 12 also proceeds to step 110 to provide the location of the tracked object in the subsequent image frame while the template library is updated.

Referring back to step 108, the object tracking processing apparatus 12 updates the one or more transient templates in the plurality of templates with an updated template based on the represented object. An overview of template matching followed by examples of how they are utilized by the object tracking processing apparatus 12 are set forth in greater detail below.

In step 112, the object tracking processing apparatus 12 updates the learned distance metric using positive and negative examples. Positive examples are collected at/near the object's estimated location, while negative examples correspond to regions further away from the object's estimated location.

Exemplary embodiments of this technology described herein provide a lightweight template update method based on random projections. Instead of comparing with the object tracking processing apparatus 12 a candidate region with a single template, either from the first frame or any previous one, a library of templates is maintained. The template library includes two types of templates and in this example is stored in template server 14, although the templates could be stored in other locations, such as in memory of the object tracking processing apparatus 12 or obtain in other manners.

The stable templates stored in the library exhibit little variation of the object's appearance. For example, stable templates can be obtained during the beginning of tracking or as soon as an object detector, that will confidently identify the object, is applied.

The transient templates stored in the library correspond to more recent observations of the object. The transient templates are updated by solving a simple optimization problem with the object tracking processing apparatus 12 that tries to increase the discriminative ability of the library while providing robustness to drift. By combining templates from the beginning of the tracking with more recent ones with the object tracking processing apparatus 12, the library will contain enough variation so that it can capture changes of the object's appearance during tracking while avoiding the problem of drifting away from the initial estimate. In both cases, the library contains the random projections of the objects appearance thus minimizing the storage requirements.

In addition to the template library, an update mechanism can be applied by the object tracking processing apparatus 12 with regards to the distance metric. Two approaches are considered. In the first approach, the distance metric is updated in a fashion that encompasses all the appearances that are included in the template library, both stable and transient. In another approach, the distance metric update mechanism is applied such that the distances between the templates (intra-distances) are smaller compared to the distances between templates and background regions collected near the estimated location of the object, but not containing the object (inter-distances).

Most template based tracking methods assume that the object is detected in the first frame, and use some metric to identify its location in subsequent frames. The assumption is that the object will remain relatively unchanged during the course of tracking. However, changes in the object's appearance may cause the failure of the tracker. Template update is employed by the object tracking processing apparatus 12 so that the object's model is consistent with the object's appearance during tracking. Template update is a challenging task because of its conflicting requirements. While the model should be updated often to keep up with the changes in the appearance of the object, occlusions, misalignments and clutter can lead to failure of the model if it is constantly updated.

A problem related with model template update is drift. Drift occurs when slight misalignments of the object's location propagate through the template update and result in a template that is inconsistent with the object that is tracked. In order to overcome this problem, the exemplary technology described herein utilizes various methods that use representations that offer robustness to possible changes of the object's appearance during tracking. These methods can be roughly divided into two categories: the ones that use off-line training in order to generate a representative model and the ones that generate a model of the target on-line i.e. during the course of tracking. In the interest of robustness, the benefits of having an accurate model of the object outweigh the increase in complexity imposed by the additional functionality. Changes in illumination and camera motion are examples of shortcomings of static model tracking that a template update tracking can overcome.

In order to deal with these issues, a hybrid template library is used by the object tracking processing apparatus 12, where some of the templates represent the target during the initial phase of tracking and some represent most recent appearances of the object. The stable templates exhibit little variation of the object's appearance. They can be obtained during the beginning of tracking or as soon as an object detector, that will confidently identify the object, is applied. The transient templates correspond to more recent observations of the target. By combining templates from the beginning of the tracking with more recent ones, the library will contain enough variation so that it can capture changes of the object's appearance during tracking while avoiding the problem of drifting away from the initial estimate.

The transient templates can be obtained in various ways. One method is to keep the templates that correspond to the last h frames with the object tracking processing apparatus 12. This simple method is computationally attractive, but, similarly to other methods that only consider the last h frames, it fails to capture the object's appearance that occurred in prior instances. In order to tackle this shortcoming, a slightly more complex method may be used by the object tracking processing apparatus 12.

At frame t, the distance between the template library and the current template is given by:

$$d(\hat{I}(X; t), M) = \min_{i=1 \ldots h} \|\hat{I}(X; t) - M_i\|_2 \quad (10)$$

If $d(\hat{I}(X;t), M) \geq d_{list}$, then replace the template that has the minimum associated distance (most similar) from the transient section of the library, with the new template and update the list of distances associated with the transient templates $d_{list}$.

The reasoning behind removing the template with the smallest distance is that templates similar with the ones that are already included in the library provide limited discriminative ability. In contrast, a large distance is a good indicator that the current template should be included in the library. When the distance is above a threshold though, it indicates that there is an occlusion as it is discussed in the next section.

In order to provide more robustness to the object tracking when a learned distance is used, the object tracking processing apparatus 12 updates the distance metric in addition to the template library. Two approaches are suggested by the object tracking processing apparatus 12 for the update of the distance metric. The first one updates the learned distance so that is will be consistent with the appearance is the template library. The second approach updates the distance metric such as the distances between the region that contains the object and regions of the background that are spatially close to the object's location is increased.

In this example, the objective of online distance metric learning is to update the distance matrix G so that $$\begin{bmatrix} d'_G(x, y) - d_G(x, y) \le \gamma \text{ if label}(x) = \text{label}(y) \\ d'_G(x, y) - d_G(x, y) > \delta \text{ if label}(x) \ne \text{label}(y) \\ G \succ 0 \end{bmatrix} \quad (11)$$

Where $\gamma$ and $\delta$ are appropriate constants that will keep the large margin between similar and dissimilar data points and could be the same to the constants u and v in Eq. 9 and 10 respectively. Techniques, such as exact and approximate gradient descent of appropriate loss functions, can be used for the achievement of this goal.

In the context of tracking, the goal of online distance metric learning by the object tracking processing apparatus 12 is to increase the similarity between elements of the templates library and to decrease the similarity between the regions that contain the object and the spatially neighboring background regions. Following the previous notation, let $\hat{I}(X;t)$ be the random projection of the description of the image region that contains the object, $M=\{M_i, i=\ldots m\}$ the template library and $\hat{J}(X_j;t)$ where $j=\{1 \ldots c\}$ are the random projections of image regions that are close to the true location X but do not contain the target. Then, the objective of online distance metric is:

$$\begin{bmatrix} d'_G(\hat{I}(X, t), M) - d_G(\hat{I}(X, t), M) \le \gamma \\ d'_G(\hat{I}(X;t), \hat{J}(X_j;t)) - d_G(\hat{I}(X;t), \hat{J}(X_j;t)) > \delta \\ G \succ 0 \end{bmatrix} \quad (12)$$

If back in step 106, the object tracking processing apparatus 12 determines the template library should not be updated, then the No branch is taken to step 110 without updating the template library at this time. The object tracking processing apparatus 12 may for example determine the template library should not be updated when an occlusion occurs as described in greater detail below.

Another advantage of the present invention is handling of occlusions by the object tracking processing apparatus 12. The challenge in occlusion handling lies in how to differentiate between expected changes in the object's appearance and unexpected object occlusion. Different poses of a human face represent an example of expected change. In this case, the new pose needs to be included into the template library by the object tracking processing apparatus 12. An example of an unexpected change is the occlusion of the face by a hand, in which case the object's model should not be updated by the object tracking processing apparatus 12.

To identify occlusion with the object tracking processing apparatus 12, a measurement of the distance between the object's model and the candidate object is obtained. Extending eq. (5), let M be the template library and J the (estimated) object in the current frame. Occlusion is detected if $$d(J(t), M) = \sum_{i=1}^{m} \|J(t) - M_i\|_2 > T \quad (13)$$

where T is a threshold. In these experiments, a predefined threshold was used in order to keep the computational complexity low. However, the threshold could also be based on the values of the large margin requirement of the distance metric learning. For example we could set $$T = \frac{u+l}{2}$$

where u and l are the margins in Eq. 7 and Eq. 8.

When occlusion is detected, the object tracking processing apparatus 12 stops updating the model and the object's location. As soon as the distance falls below the threshold, the tracking by the object tracking processing apparatus 12 continues by updating the model and the object's location.

An issue that may rise by halting the object's tracking is that, when tracking resumes, the object may be further away from its previous known location. In order to compensate for the larger distance between the object's previous location and the current one, the block matching's search range is doubled by the object tracking processing apparatus 12 until the object is found again, in which case the search window is restored back to its original range in order to support the low computational complexity of the method.

In step 110, the object tracking processing apparatus 12 provides the location of the tracked object in the subsequent image frame. Accordingly, as illustrated and described in the examples herein this technology provides a method for tracking objects based on random projections which offers the benefits of fast, low-complexity transformation of the input data into accurate and computationally attractive representations. Random projections are used for the generation of a template library that describes the object's appearance and achieves robustness under pose variations. Further, the random projections model is used with this technology for reliable handoff between different cameras with partially overlapping fields of view. This method is tailored to the limited processing capabilities of smart cameras by requiring reduced network bandwidth during camera handoff and low memory requirements for the template library maintenance. Experimental results indicate this technology can maintain robust tracking under varying object pose and across camera views while using limited resources, a benefit for embedded vision systems.

Exemplary Experiments:

By way of example only, this method was tested in various scenarios. The images were 320×280 pixels resolution and an object of the size of 50×50 pixels was tracked. Random projections reduced the input vector from 2500 (50×50) to 700 elements vectors. The template library has 16 frames of both stable and transient templates. In this example, the inner product was used as the distance metric although the previously mentioned metrics can also be used.

Figure 4:
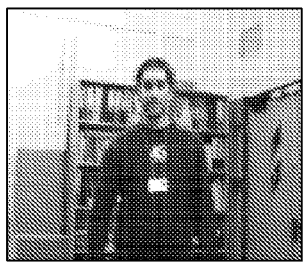
FIG. 4 is an exemplary sequence of image frames as a person moves through a room and changes poses.
Figure 4:
Figure 4:
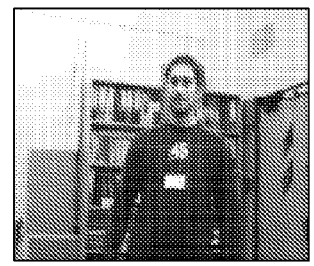
Figure 4:
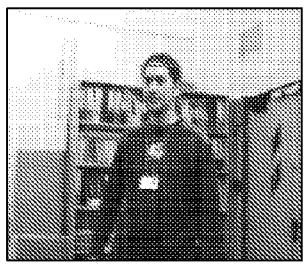
Figure 4:
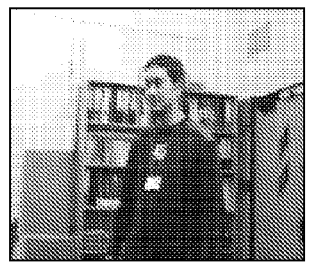
Figure 4:
Figure 4:
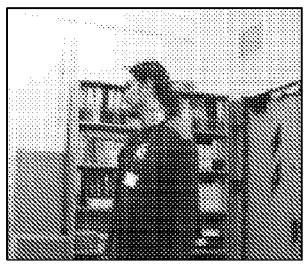
Figure 4:
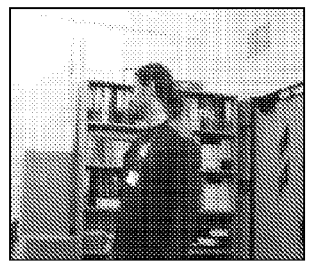
Figure 4:
Figure 4:
Figure 4:
Figure 4:

The first test sequence, shown in FIG. 4 is part of the "Motivas-Toni" sequence and shows a person moving through a room while he changes his pose from frontal view in frame 84 to profile view in frame 106 and back to frontal view in frame 190.

Figure 5:
FIG. 5 is an exemplary sequence of image frames of a person sitting and turning his head.
Figure 5:
Figure 5:
Figure 5:
Figure 5:
Figure 5:
Figure 5:
Figure 5:
Figure 5:
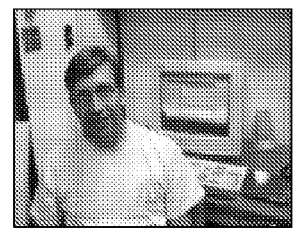
Figure 5:
Figure 5:
Figure 5:
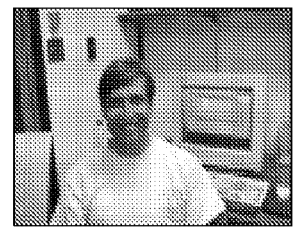

The second test sequence, shown in FIG. 5, is part of the "Dudek" sequence and tracks the face of a man sitting and turning his head while he is recorded by a slowly moving camera. The proposed method is robust to both small egomotion and changes in pose observed in frames 3 to 173, occlusion in frame 206 and small changes in the object's appearance in frames 223 to 492.

Figure 6:
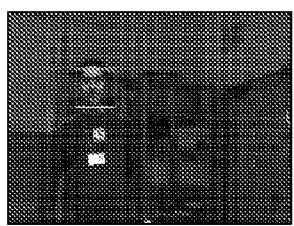
FIG. 6 is an exemplary sequence of image frames of a persons face with severe illumination changes.
Figure 6:
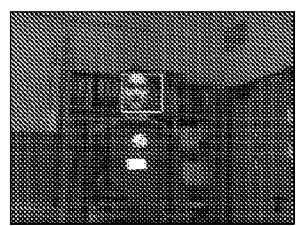
Figure 6:
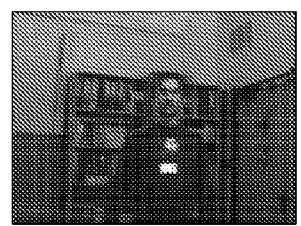
Figure 6:
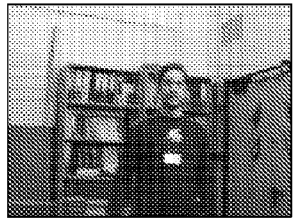
Figure 6:
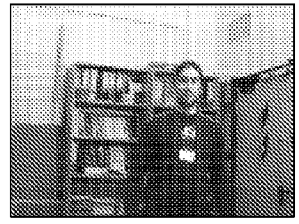
Figure 6:
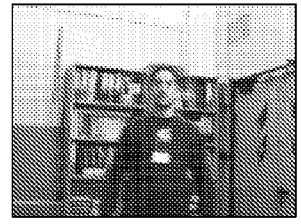

The third test sequence is presented in FIG. 6 and is a small part of the "Motivas Toni change illumination" sequence. The method correctly tracks the face despite the severe illumination changes.

Figure 7:
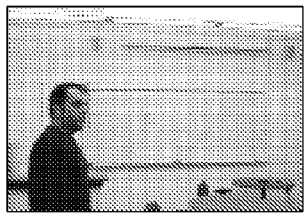
FIG. 7 is an exemplary sequence of image frames captured by two cameras with overlapping fields of view.
Figure 7:
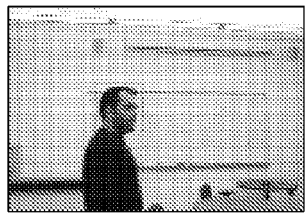
Figure 7:
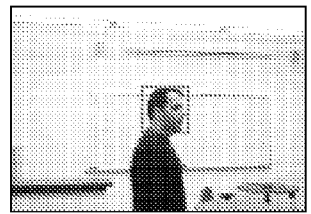
Figure 7:
Figure 7:
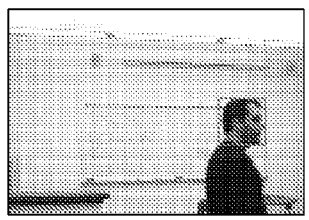
Figure 7:
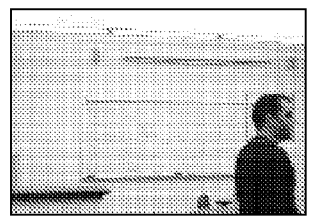
Figure 7:
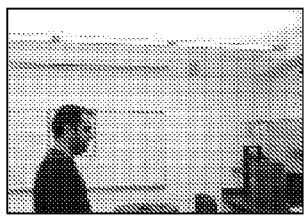
Figure 7:
Figure 7:
Figure 7:
Figure 7:
Figure 7:
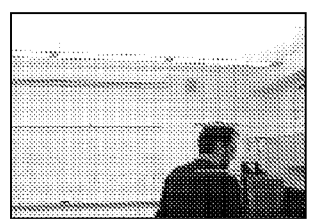

The final test sequence, shown in FIG. 7, was captured by two cameras with overlapping fields-of-view. The top two rows correspond to the first camera and the remaining to the second camera. The transition between the two cameras is performed without any degradation in tracking accuracy by communicating the template library that was generated in the first camera to the second camera. No additional calibration between the cameras was performed.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for tracking a location of an object in a sequence of images, the method comprising the steps of:
    representing the object in a current image of the sequence of images with an object template which comprises an image patch window covering an object region, wherein the sequence of images comprises previous, current, and subsequent images;
    representing the current and previous object templates in a dictionary of object templates;
    representing a candidate region in the subsequent image with one or more of a plurality of candidate windows corresponding to regions in the subsequent image on and around the location of the object in the current image;
    representing the background of the current image with a dictionary of background templates comprised of a plurality of windows located around the object template;
    computing a distance between the candidate windows and the object templates, using a learned distance metric based on the characteristics of the object templates and background templates;
    finding a winner candidate window that has the minimum learned distance from at least one of the object templates and selecting the winner candidate window location as the location of the object in the subsequent image; and
    updating the dictionary of object templates by incorporating the winner candidate.

2. The method as set forth in claim 1 wherein the learned distance metric is determined using Kullback-Leibler divergence information theoretic metric learning.

3. The method as set forth in claim 1 wherein the learned distance metric is computed in real-time.

4. The method as set forth in claim 1 wherein one or more of the object templates, background templates, and candidate windows are represented in a data space of reduced dimensionality obtained by representing each with a local descriptor and applying random projections transformation on the descriptor data.

5. The method as set forth in claim 1 wherein the dictionary of object templates comprises one or more stable templates and one or more transient templates, such that the stable templates are obtained by application of an object detector and transient templates are updated using information from the winner candidate window.

6. The method as set forth in claim 1 further comprising identifying that an occlusion of the object has occurred when the computed distance is above a threshold, wherein the updating of the dictionary of object templates and background dictionary is discontinued when the occlusion is identified.

7. A non-transitory computer readable medium having stored thereon instructions for tracking a location of an object in a sequence of images comprising machine executable code which when executed by at least one processor, causes the processor to perform steps comprising:
    representing the object in a current image of the sequence of images with an object template which comprises an image patch window covering an object region, wherein the sequence of images comprises previous, current, and subsequent images;
    representing the current and previous object templates in a dictionary of object templates;
    representing a candidate region in the subsequent image with one or more of a plurality of candidate windows corresponding to regions in the subsequent image on and around the location of the object in the current image;
    representing the background of the current image with a dictionary of background templates comprised of a plurality of windows located around the object template;
    computing a distance between the candidate windows and the object templates, using a learned distance metric based on the characteristics of the object templates and background templates;
    finding a winner candidate window that has the minimum learned distance from at least one of the object templates and selecting the winner candidate window location as the location of the object in the subsequent image; and
    updating the dictionary of object templates by incorporating the winner candidate.

8. The medium as set forth in claim 7 wherein the learned distance metric is determined using Kullback-Leibler divergence information theoretic metric learning.

9. The medium as set forth in claim 7 wherein the learned distance metric is computed in real-time.

10. The medium as set forth in claim 7 wherein one or more of the object templates, background templates, and candidate windows are represented in a data space of reduced dimensionality obtained by representing each with a local descriptor and applying random projections transformation on the descriptor data.

11. The medium as set forth in claim 7 wherein the dictionary of object templates comprises one or more stable templates and one or more transient templates, such that the stable templates are obtained by application of an object detector and transient templates are updated using information from the winner candidate window.

12. The medium as set forth in claim 7 further comprising identifying that an occlusion of the object has occurred when the computed distance is above a threshold, wherein the updating of the dictionary of object templates and background dictionary is discontinued when the occlusion is identified.

13. An object tracking apparatus comprising:

one or more processors;

a memory coupled to the one or more processors, the one or more processors configured to execute programmed instructions stored in the memory comprising:

representing the object in a current image of the sequence of images with an object template which comprises an image patch window covering an object region, wherein the sequence of images comprises previous, current, and subsequent images;

representing the current and previous object templates in a dictionary of object templates;

representing a candidate region in the subsequent image with one or more of a plurality of candidate windows corresponding to regions in the subsequent image on and around the location of the object in the current image;

representing the background of the current image with a dictionary of background templates comprised of a plurality of windows located around the object template;

computing a distance between the candidate windows and the object templates, using a learned distance metric based on the characteristics of the object templates and background templates;

finding a winner candidate window that has the minimum learned distance from at least one of the object templates and selecting the winner candidate window location as the location of the object in the subsequent image; and updating the dictionary of object templates by incorporating the winner candidate.

14. The apparatus as set forth in claim 13 wherein the learned distance metric is determined using Kullback-Leibler divergence information theoretic metric learning.

15. The apparatus as set forth in claim 13 wherein the learned distance metric is computed in real-time.

16. The apparatus as set forth in claim 13 wherein one or more of the object templates, background templates, and candidate windows are represented in a data space of reduced dimensionality obtained by representing each with a local descriptor and applying random projections transformation on the descriptor data.

17. The apparatus as set forth in claim 3 wherein the dictionary of object templates comprises one or more stable templates and one or more transient templates, such that the stable templates are obtained by application of an object detector and transient templates are updated using information from the winner candidate window.

18. The apparatus as set forth in claim 13 further comprising identifying that an occlusion of the object has occurred when the computed distance is above a threshold, wherein the updating of the dictionary of object templates and background dictionary is discontinued when the occlusion is identified.

* * * * *